No. 790,717. PATENTED MAY 23, 1905.
J. B. BROOKS & J. HOLT.
CYCLE SADDLE.
APPLICATION FILED JAN. 15, 1904.

2 SHEETS—SHEET 1.

WITNESSES
INVENTORS John B. Brooks
John Holt

No. 790,717. PATENTED MAY 23, 1905.
J. B. BROOKS & J. HOLT.
CYCLE SADDLE.
APPLICATION FILED JAN. 15, 1904.
2 SHEETS—SHEET 2.
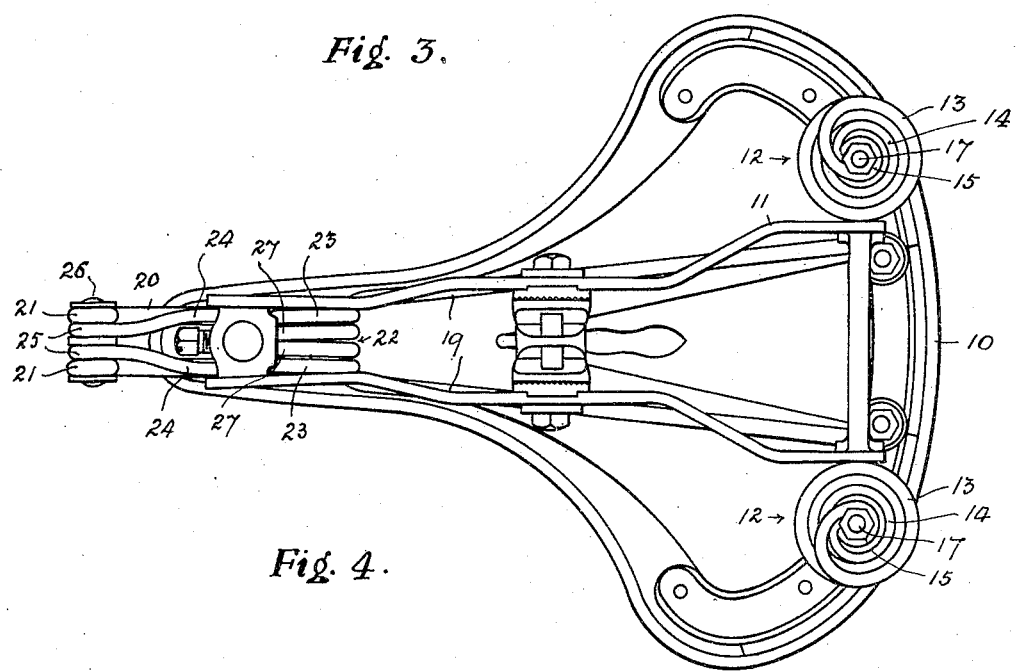
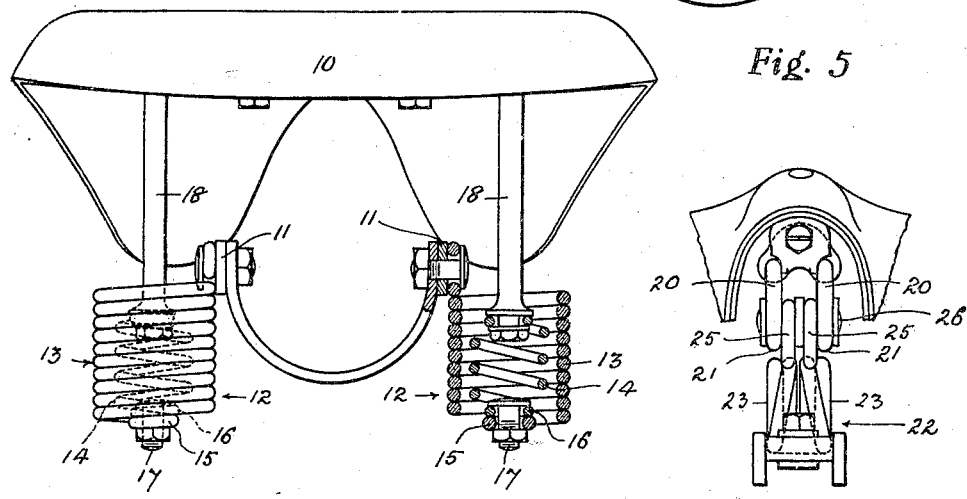
WITNESSES
INVENTORS John B. Brooks
John Holt
By James L. Norris
Atty.

No. 790,717. Patented May 23, 1905.

UNITED STATES PATENT OFFICE.

JOHN BOULTBEE BROOKS AND JOHN HOLT, OF BIRMINGHAM, ENGLAND.

CYCLE-SADDLE.

SPECIFICATION forming part of Letters Patent No. 780,717, dated May 23, 1905.

Application filed January 15, 1904. Serial No. 189,177.

*To all whom it may concern:*

Be it known that we, JOHN BOULTBEE BROOKS, managing director, and JOHN HOLT, works manager, subjects of the King of Great Britain, both of J. B. Brooks and Company, Limited, Criterion Works, Great Charles street, Birmingham, England, have invented certain new and useful Improvements in Cycle-Saddles, of which the following is a specification.

This invention has relation principally to saddles for motor-cycles, but is also applicable to ordinary cycle-saddles, and has for its primary object to provide such saddles with improved compound anticoncussion or antivibration spring devices for resiliently supporting the seats of same, the members or elements of such devices being so formed and arranged in interdependent and connected combination that they will mutually reciprocate or coöperate in preventing or neutralizing and compensating for the rebound or reaction of the said devices after they have been made active by the passage of the cycle over an obstruction in its path.

Figure 1:
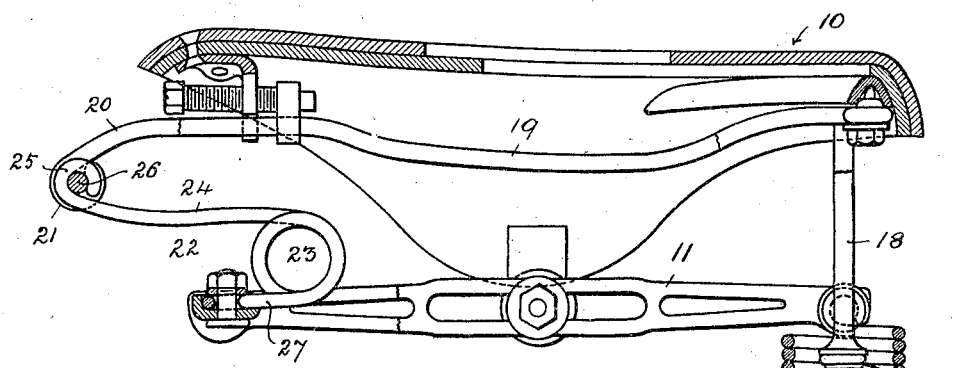
Figure 2:
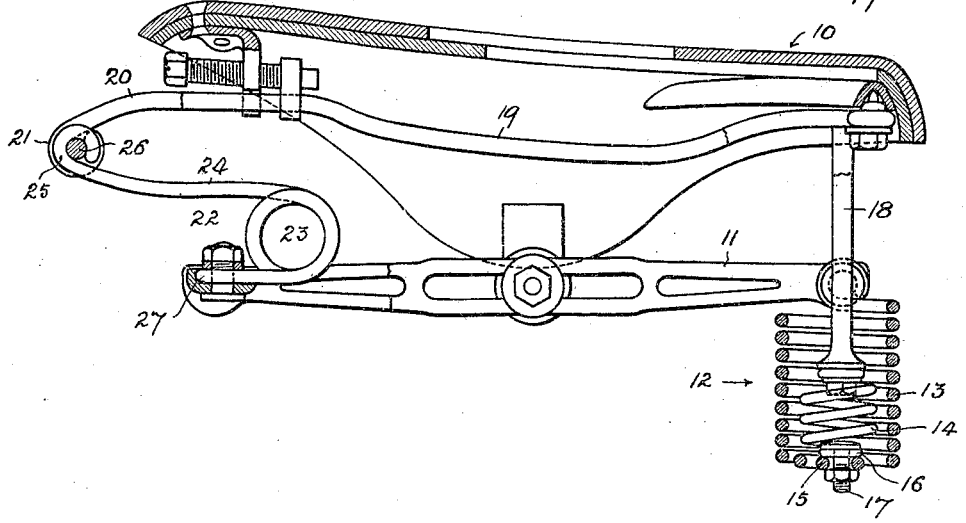

Figure 1 of the accompanying drawings represents a longitudinal section of a motor-cycle saddle illustrating one method of applying the improved compound spring devices, which are shown in their normal condition. Fig. 2 is a similar view, but shows the members of the compound spring in the form they assume when the saddle is loaded. Fig. 3 is an under side plan of the saddle. Fig. 4 is a back elevation of the saddle with one of the compound spring devices in section. Fig. 5 shows an elevation of the front of the saddle.

The same numerals of reference indicate corresponding parts in the several figures of the drawings.

In the particular arrangement shown the back of the saddle 10 is resiliently supported from the underframing 11 through the medium of a pair of combined anticoncussion and antirebound devices 12, each consisting, essentially, of a close-coiled distensible spring 13, suspended from the underframing, and a compressible spring 14, connected with the seat and in interdependent connection with the suspension-spring, which is the outer member of the device and has its coils closely wound and of considerable diameter, so that the said spring can be easily distended, whereas the other and inner spring, which is open-coiled and compressible, is of much less diameter than the outer spring, and so offers relatively greater resistance to compression than the said outer spring does to distension.

The two springs are made or formed independently, so that their relative strengths may be properly proportioned to insure the desired result and they may be connected together in various ways to insure their interdependent action in compensating for rebound, and in the form shown this connection is made by forming eyes 15 16 at the terminations of the bottom coils of both members and passing a pin or bolt 17 therethrough and securing them by means of a nut.

To connect the saddle-seat with the suspended spring devices, its cantle-plate is provided on each side with a vertically-depending rod or hanger 18, which extends centrally or axially into the suspension member 13 and is made fast at its lower end to the summit of the internal compression-spring 14, whose coils are thus interposed between the seat-hanger and the distensible spring and constitute a compressible connection between the parts, wherethrough all motion conveyed from the one to the other has to be transmitted.

When the saddle is loaded, the pressure applied to the seat is transmitted, through the hanger-rods, to the internal springs, which are thereby compressed and in turn transmit the movement to the lower ends of the suspended distensible springs, whose coils are opened out until the weight of the load is balanced and resiliently supported; but when the cycle to which the saddle is fitted rises in passing over an obstruction the underframing 11, being secured to and relatively immovable with respect to the said machine, is made to approach the loaded seat and momentarily decrease the distance between these parts. By this upward relative movement of the underframe a pull is applied to the upper ends of the distensible springs, whose coils are further separated, while simultaneously the coils of the compression-springs are more or less further closed by compression between the bottom coils of the outer springs and the lower extremities of the hanger-rods. By the coöperation or mutual effect of the oppositely-acting and interdependently-connected springs the shock or concussion set up by the passage of the cycle over the obstruction is effectively taken up or absorbed and prevented from being transmitted, through the hanger-rods, to the seat, whereas after the machine has cleared the obstruction and the saddle frame and seat tend to separate or resume their normal relative positions the coils of the compression-springs in separating to their normal condition act in opposition to and tend to balance or cushion the closing reaction of the distensible springs, whose return is checked, and thus the reaction of the devices is moderated and the creation and transmission to the rider of any unpleasant shock, jolt, or rebound are prevented.

By the use of suspended distensible members which are closely coiled or closely wrapped, as shown, it is possible to obtain a considerable range of distending movement from a relatively small and compact spring.

It is obvious that the seat-hangers may be dispensed with altogether and that the yielding seat may be made to act directly upon the upper end of a compression-spring, which in turn transmits the movements of the seat to the lower end of the suspended extension-spring. The front of the saddle may also be resiliently supported upon one or more compound spring devices of the construction herein described; but in the arrangement illustrated the said front is resiliently supported upon a special form of spring of the levering-arm type. The seat-stretcher members 19 of the saddle are extended beyond the peak into a pair of curved arms 20, terminating in eyes or loops 21, and between these arms and the fore end of the underframing there is interposed a spring 22, consisting of a pair of coils 23, arranged vertically at a point below and some distance inward of the peak of the seat, and from the tops of these loops a pair of long levering-arms 24 extend forwardly and upwardly and terminate in eyes or loops 25, which are placed coincident with the loop terminations 21 of the stretcher-rod extensions and are jointedly connected thereto by a transversely-disposed pin 26. The bottoms of the loop-coils are also extended into shorter arms 27, which are rigidly secured to the underframing. The two twin springs are preferably formed from a single length of wire, in which case the bottom or stand side arms are connected at their front ends and clamped to the underframe by a nut and bolt.

By the employment of levering-springs in which the loop-coils are set inward beyond the end of the seat and are provided with arms which are jointed to extensions of the seat-stretcher wires the peak of the seat is resiliently and flexibly supported and a maximum of ease and comfort is obtained, as the excessive vibration developed by heavy motor-cycles and the like when traveling at high speeds is effectually absorbed and neutralized.

Having fully described our invention, what we desire to claim and secure by Letters Patent is—

1. A resiliently-supporting device for cycle-saddle seats comprising the combination with the underframing of the seat, of a spring-supporting means connected with the peak of the saddle and the underframing, a pair of hanger-rods secured at their upper ends to each side of the cantle-plate of the saddle, a pair of closely-coiled and separated distensible springs attached to the rear of the underframing, a compressible spring arranged in each of said distensible springs and connected at their upper ends to the lower end of said hanger-rods, and means for connecting the lower ends of said compression-springs to the lower end of said distensible spring.

2. A resiliently-supporting device for cycle-seats, comprising the combination with the underframing of the seats and means for suitably connecting the seat at its forward end with the underframing, of a pair of hanger-rods secured at their upper ends with the seats, a pair of closely-coiled distensible springs suitably spaced apart and attached at their upper end to the rear of the underframing, a compressible spring arranged in each of said distensible springs and connected at their upper end to the lower end of said hanger-rods, and means for connecting the lower end of said compression-spring to the lower end of said distensible springs.

In testimony whereof we have hereunto set our hands in presence of two subscribing witnesses.

JOHN BOULTBEE BROOKS.
JOHN HOLT.

Witnesses:
 HENRY SKERRETT,
 HENRY NORTON SKERRETT.